(12) United States Patent
Stamey, Jr. et al.

(10) Patent No.: US 6,800,194 B1
(45) Date of Patent: Oct. 5, 2004

(54) LOW WASTE LIQUID FILTER

(75) Inventors: Willie Luther Stamey, Jr., Kings Mountain, NC (US); Gregory Keith Rhyne, Denver, NC (US)

(73) Assignee: Dana Corporation, Toledo, OH (US)

( * ) Notice: Subject to any disclaimer, the term of this patent is extended or adjusted under 35 U.S.C. 154(b) by 49 days.

(21) Appl. No.: 09/962,358

(22) Filed: Sep. 26, 2001

(51) Int. Cl.$^7$ .............................................. B01D 35/34
(52) U.S. Cl. ........................ 210/96.1; 210/130; 210/445; 210/493.3
(58) Field of Search .......................... 55/497; 210/96.1, 210/130, 445, 450, 451, 455, 493.1, 493.3; 123/196 A

(56) References Cited

U.S. PATENT DOCUMENTS

| | | | | |
|---|---|---|---|---|
| 2,073,991 A | * | 3/1937 | Koser | 210/445 |
| 3,513,982 A | * | 5/1970 | Carter et al. | 210/435 |
| 4,133,661 A | | 1/1979 | Strnad | |
| 4,169,059 A | * | 9/1979 | Storms | 210/493.1 |
| 4,196,059 A | * | 4/1980 | Petrov et al. | 205/575 |
| 4,422,939 A | | 12/1983 | Sharp et al. | |
| 4,446,017 A | * | 5/1984 | Oberg | 210/90 |
| 4,710,297 A | * | 12/1987 | Suzuki et al. | 210/493.2 |
| 4,976,677 A | | 12/1990 | Siversson | |
| 5,237,432 A | | 8/1993 | Calarco et al. | |
| 5,435,170 A | * | 7/1995 | Voelker et al. | 73/53.05 |
| 5,531,892 A | * | 7/1996 | Duffy | 210/493.1 |
| 5,853,577 A | | 12/1998 | Gizowski et al. | |
| 5,863,424 A | | 1/1999 | Lee | |
| 5,885,455 A | | 3/1999 | Graus et al. | |

FOREIGN PATENT DOCUMENTS

| | | | | |
|---|---|---|---|---|
| DE | 958467 | * | 2/1957 | 210/445 |
| DE | 1138280 | * | 10/1962 | 210/130 |
| FR | 1088616 | * | 9/1954 | 210/130 |

* cited by examiner

Primary Examiner—Matthew O. Savage
(74) Attorney, Agent, or Firm—Millen, White, Zelano & Branigan, P.C.

(57) ABSTRACT

A lubricating oil filter has a housing which includes a first shell providing a housing base and a second shell providing a housing lid, wherein a filter media is suspended in a space defined by the shells by being clamped between a shoulder in the housing base and a rib projecting from the housing lid. The filter media may be either a flat filter media or a pleated pack filter media. In a preferred configuration, the housing is rectangular and has an unfiltered oil inlet in the housing lid which is at one end of the housing and a filtered oil outlet which is at the other end of the housing.

5 Claims, 3 Drawing Sheets

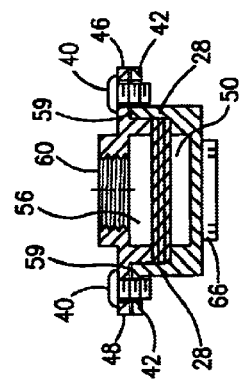
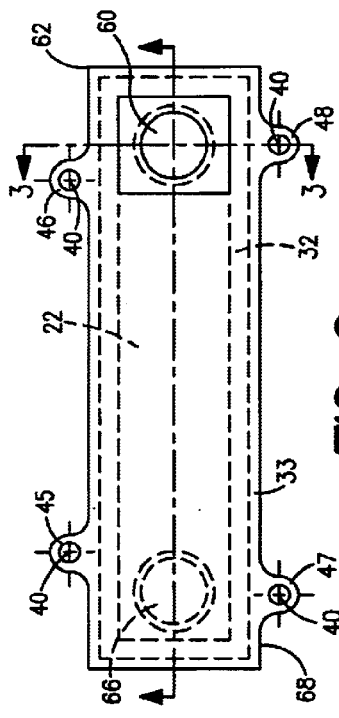
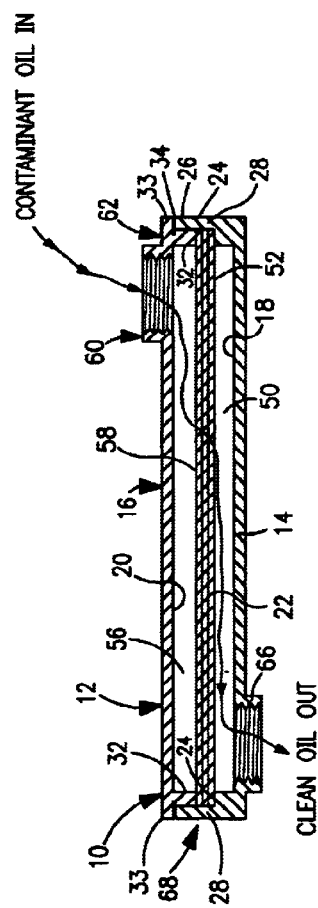
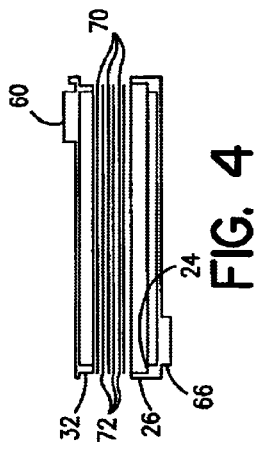

LOW WASTE LIQUID FILTER

FIELD OF THE INVENTION

The present invention is directed to a low waste liquid filter. More particularly, the present invention is directed to a low waste liquid filter in which the filter media used therewith is replaceable.

BACKGROUND OF THE INVENTION

For many years, internal combustion engines used by vehicles have generally relied on spin-on type oil filters for lubricating oil. These filters are periodically changed and must be disposed of. In the past lubricating oil filters were disposed of in landfills, a practice now forbidden because spin-on housings and filter media contain lubricating oil which can contaminate the soil and ground water. It is therefore the current practice to disposed of these filters in other ways.

Since spin-on filters necessarily have cylindrical housings, filter media is most conveniently annular which is not necessarily the best configuration for the filter if the filter media must be removed. This is because the axis of a spin-on type filter necessarily projects from the engine block thus taking up additional lateral space. In order to remove the annular filter media without removing its canister there must be space provided for both the axial extent of the canister and the axial extent of the filter media. Accordingly, the canister must be removed, opened and reclosed with a new annular filter before it is replaced.

Moreover, it is not possible to check the condition of the filter media of disposable spin-on filters, nor is it convenient to sample filtered or unfiltered liquid.

Additionally, since the lubricating oil normally flows from an annular space external the filter media to a hollow cylindrical space within the filter media, tapping the central space within the filter media with a probe to obtain technical information (such as pressure within the filter media and the condition of just filtered oil) presents a challenge since such probes must penetrate both the housing and the closed end of the filter element of which the filter media is an integral part.

In view of these considerations, there is a need for oil filter configurations which address the current requirements that used filter media be recycled in a way that does not endanger the environment, while having a configuration which is conveniently mounted with respect to space available in a vehicle having an engine, while providing convenient access for inspecting the filter media and lubrication oil, and for mounting monitoring probes.

SUMMARY OF THE INVENTION

In view of the aforementioned considerations, the present invention is directed to a lubricating oil filter comprising a housing having a first shell with a first wall and a second shell having a second wall facing the first wall. A shoulder is provided on the first wall, which shoulder faces the second wall and a filter media is mounted on the shoulder in spaced relation to the first wall to define an filter oil collection chamber between the filter media and the first wall. A rib is provided on the second wall, the rib faces the shoulder on the first wall and engages the filter media to clamp the filter media between the first and second walls, the rib being in spaced relation to the second wall to define a distribution chamber between the filter media and the second wall for receiving unfiltered lubricating oil. An unfiltered lubricating oil inlet is disposed through the second wall and a filtered lubricating oil outlet is disposed through the first wall. The inlet is laterally spaced from the outlet, whereby unfiltered lubricating oil is spread over the filter media after entering the inlet being filtered by the filter media; collected as filtered lubricating oil in the collection chamber and passed through the filtered lubricating oil outlet.

In a more specific aspect of the invention, the filter media is a flat sheet filter media, and in an alternative aspect of the invention, the filter media is a pleated pack filter media.

In still a more specific aspect of the invention, the housing is configured as a rectangle or square with the inlet being at one end of the rectangle and the outlet being at the other end of the rectangle.

In still further aspects of the invention, a bypass valve can be provided in the lubricating oil filter, the bypass being through the filter media itself, being integral with the housing or bypassing the lubricating oil filter completely.

Still another aspect of the invention, if the filter media is a pleated pack filter media, the peaks and valleys thereof extend the inlet to the outlet.

BRIEF DESCRIPTION OF THE DRAWINGS

FIG. 1 is a side elevation of a first embodiment of a lubricating oil filter configured in accordance with the principles of the present invention;

FIG. 2 is a top view of the lubricating oil filter of FIG. 1, with portions in dotted lines;

FIG. 3 is an end elevation view taken on lines 3—3 of FIG. 1;

FIG. 4 is an exploded view of the filter element of the lubricating filter of FIGS. 1–3;

DETAILED DESCRIPTION

Figure 5:
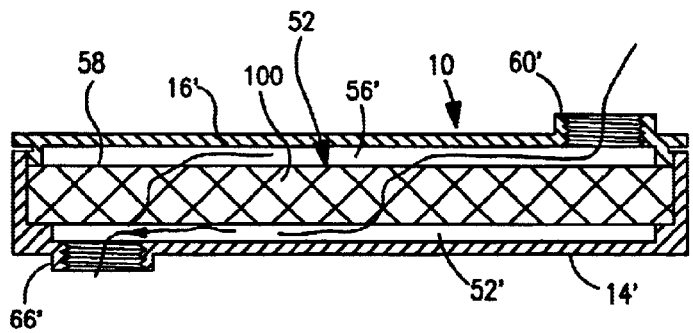
FIG. 5 is a side elevation of a second embodiment of the lubricating oil filter according to the invention.
Figure 6:
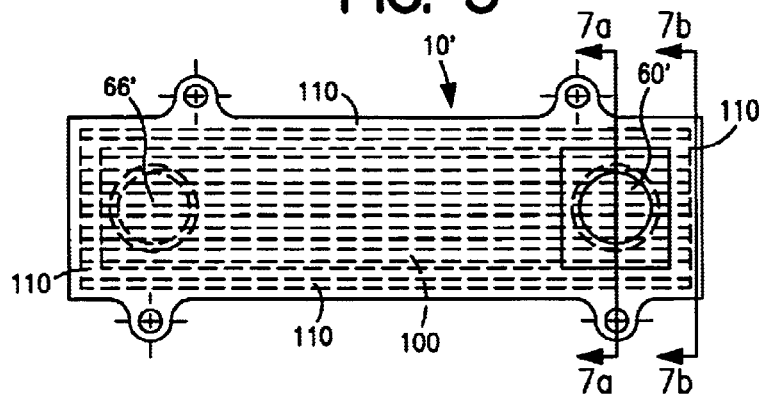
FIG. 6 is a top view of the lubricating oil filter according to FIG. 5 with portions being shown in phantom.
Figure 8:
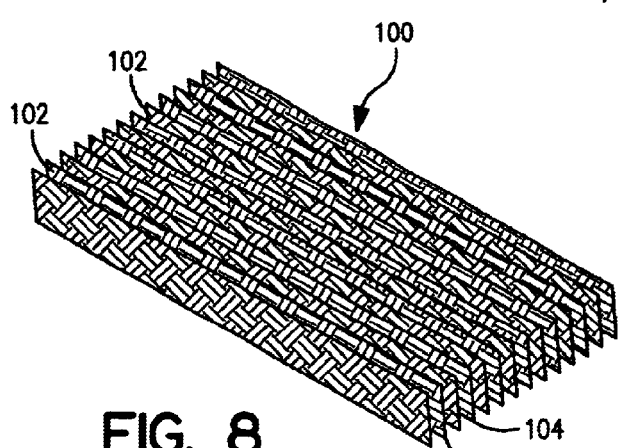
FIG. 8 is a perspective view of a pleat pack used with the embodiment of FIGS. 5–7.
Figure 7A:
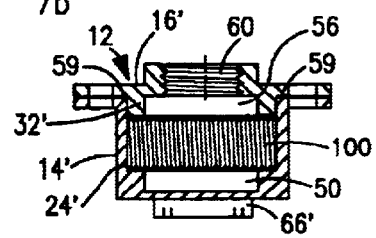
FIG. 7 is an end elevation of the lubricating oil filter in accordance with the present invention, taken along lines 7—7 of FIG. 5.
Figure 7B:
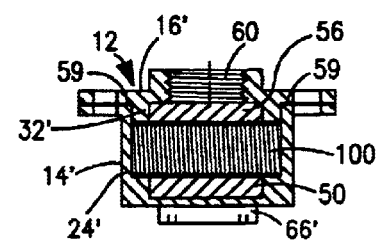
Figure 9:
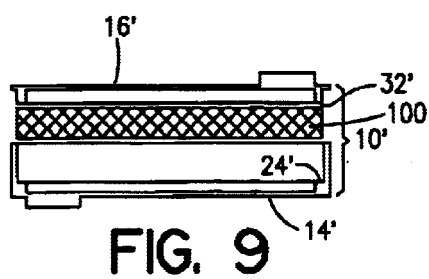
FIG. 9 is a side exploded view of the embodiment of FIGS. 5–8.

Referring now to FIGS. 1–4 there is shown a first embodiment 10 of lubricating oil filter configured in accordance with the principles of the present invention. The lubricating oil filter 10 has a housing 12 with a housing base in the form of the first shell 14 and a housing lid in the form of a second shell 16. The first shell 14 has a first base wall 18 and the second shell 16 has a top wall 20, which walls face one another in opposed relation. Disposed between the first wall 18 and the second wall 20 is a filter media 22 that is supported on a shoulder 24 which is in spaced relation to the first wall 18. Projecting from the shoulder 24 is a peripheral rim 26 which surrounds the peripheral edge No. 28 on illustration 1–4 of the filter media 22. The second shell 16 which forms the housing lid has a rib 32 just inside peripheral lip 33 which aligns with the shoulder 24 and nests within the first shell 14 with the peripheral lip 33 overlying the upper edge 34 of the peripheral rim 26.

Upon placing the filter media 22 on the shoulder 24 and then inserting the rib 32 of the second shell 16 into the spaced defined by the peripheral rim 26, the filter media 22 is clamped within the housing 12. The filter media is compressible adjacent its peripheral edge 28 upon inserting and tightening bolts 40 through holes 42 in aligned lugs 45, 46, 47 and 48 on the first and second shells 14 and 16, respectively. The suspension of the filter media 22 in the housing 10 provides a clean side collection chamber 50 between the clean side 52 of the filter media and the side surface of the first wall 18 and a dirty side distribution chamber 56 between the second wall 20 and the dirty side 58 of the filter media 22. Sealing to seal the housing 10 and to separate the dirty side and clean side chambers 56 and 50 can be effected by compressing the filter media 22 adjacent its peripheral edge 28, or if necessary by a gasket or O-ring 59 disposed between mating surfaces of the first and second shells 14 and 16. Preferably, the housing 12 has an elongated, rectangular configuration with an unfiltered oil inlet port 60 at one end 62 of the housing 12 that communicates with the distribution chamber 56. Preferably, the filter oil inlet port 60 is an internally threaded port through the wall 20 of the upper shell 16. A filtered oil outlet port 66 is disposed at the second end 68 of the housing, the filtered oil outlet port 66 also preferably being an internally threaded port.

In operation, filtered oil enters the filtered oil port 60 and flows into the distribution chamber 56 where it spreads over the dirty side 58 of the filter media 22 and passes through the filter media into the collection chamber 50, from which it exits through the filtered oil outlet port 66.

In the first embodiment 10 of the invention, the filter media 22 is preferably a flat filter media comprised of single layer or multiple layer sheets 70 of filter material with wire spacer supports 72 (see FIG. 4) therebetween. The wire spacer supports 72 may be in the form of wire screens sandwiched between the filter media layers 70. In FIG. 4 there are three layers of flat filter sheets 70 and three wire support layers 72, with the bottom support layer abutting the shoulder 24, however there may be any effective number of sheets or supports including a configuration where there is a single sheet, with or without wire supports.

Referring now to the second embodiment 10' of the lubricating oil filter shown in FIGS. 5–9, the flat filter media 22 has been replaced by a pleated pack filter media 100, wherein the pleated pack filter media includes peaks 102 and valleys 104 which extend parallel in a direction from an unfiltered oil inlet 60' to a filtered oil outlet 66'. The pleated filter media 100 may be either supported by wire mesh or be self-supporting. Preferably, the peaks and valleys 102 and 104 extend parallel to the direction of vehicle motion, if there is a need to prevent intermittent oil starvation when the vehicle is cornered sharply. In all other respects, the second embodiment 10' of the lubricating oil filter is substantially the same as the first embodiment 10 of the lubricating oil filter.

In a preferred embodiment, the shells 14' and 16 have grooves 110 defining peaks and valleys (see FIG. 6) which engage only end and side portions of the filter media 100 by mating with the valleys 104 and peaks 102 of the filter media, and thus securely suspend the filter media in the housing 10'. As with the first embodiment, compression of the peripheral portions of the filter media 100 can provide sealing of the shells 14 and 16 and provide isolation of the clean side of chamber 50' from the dirty side chamber 56'. Alternately or additionally a peripheral seal 59 may be employed.

While a rectangular shape is illustrated and preferred, the lubricating oil filters 10 and 10' may have any shape so as to correspond to convenient and available spaces in a motor vehicle. In a preferable embodiment, the housing base provided by the first shell 14 is below the housing lid provided by the second shell 16 so that it is convenient to inspect the filter media 22 or 100 for trapped particles, or the oil for contamination, by simply removing the second shell which functions as a housing lid. This also allows one to conveniently remove used filter media and replace it with fresh media, all with minimal spillage of oil.

Figure 10:
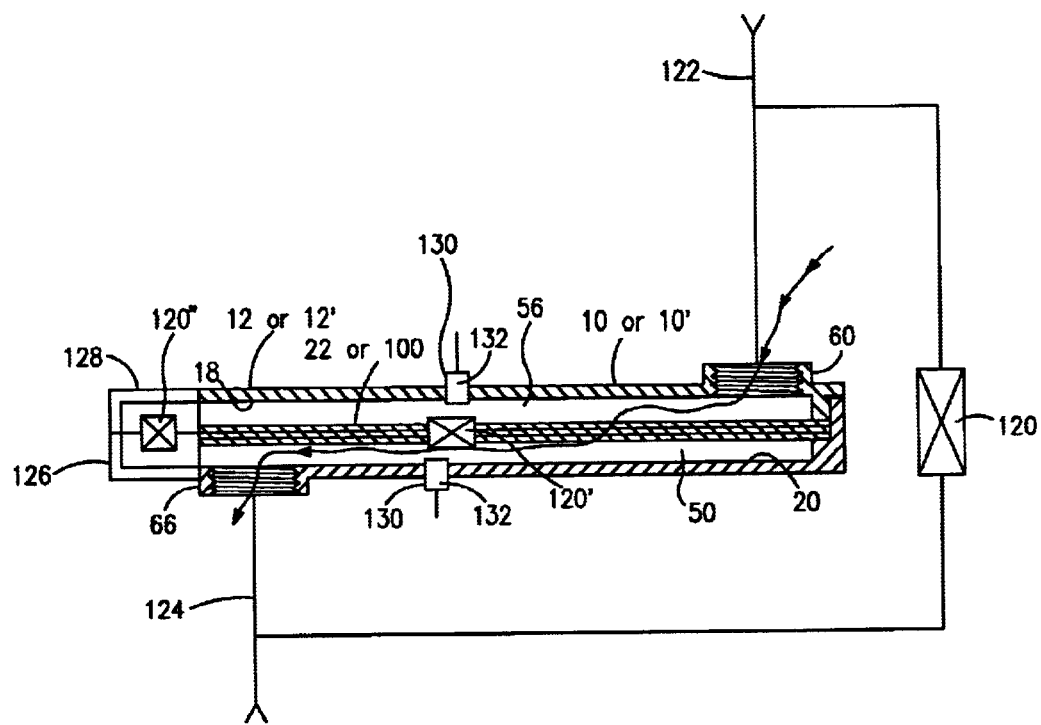
FIG. 10 is a side elevation of a filter element according to the invention showing bypass valve and sensing probe options.

As is seen in FIG. 10, a bypass valve 120 which allows continued circulation of oil when the filter media 22 or 100 becomes clogged can be installed optionally between an inlet line 122 to the unfiltered oil inlet 60 and an outlet oil line 124 connected to the filtered oil outlet 66. Alternatively, the bypass valve 120' may be integral with the filter media (22 or 100) or the bypass valve 120" may be integral with the housing 12 or 12' by extending and connecting portions 126 and 128 of the housing which connect the distribution chamber 56 to the collection chamber 50.

In addition, ports 130 with probes 132 may be placed through the first wall 18 and/or the second wall 20 to monitor conditions such as differential pressure between the dirty side 52 of the filter media 22 and 100 and the clean side 58 of the filter media. Moreover, probes 132 may be inserted through the walls 18 and 20 of the housing 12 to monitor the quality of the oil being circulated by for example, sensing the PH of the oil and/or the presence of substances in the oil, such as acids, which indicate operating conditions of the engine with which the lubricating oil filter 10 is associated. The ports 130 can also be used to fill and drain the housing 10 or to obtain oil samples for analysis.

When the need to replace the filter media 22 or 100 arises, the housing lid 16 is removed, the contaminated filter media removed, a new filter media installed, the lid replaced and the vehicle or other application put back into service. The contaminated filter media 12 or 100 is then separated from the wirebacking (if wirebacking is used) and the wire recycled. The filter media 22 or 100 is then recycled, crushed, or incinerated as required. Based on the WIX 51268R racing oil filter as an example, by weight the waste would be reduced by more than 90% (564 grams dry weight to less than 50 grams dry weight of waste). If widely employed this invention would have a substantive impact on waste generated and reduce overall environment damage and concerns associated with the disposal of used filters.

While the aforedescribed invention is exemplified by a lubricating oil filter the same structure may be utilized as a fuel filter, a transmission oil filter or other fluid filter.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A lubricating oil filter, comprising:
   a housing having a first shell with a first wall having a first peripheral rim extending transversely thereto, and a second shell with a second wall facing the first wall, the second wall having a second peripheral rim extending transversely thereto;
   a shoulder on the first wall, the shoulder facing the second wall;

a pleated pack filter media mounted on the shoulder in spaced relation to the first wall to define a filtered oil collection chamber between the filter media and first wall, the pleated pack filter media defining filter media peaks and valleys extending in a selected direction;

a rib on the second wall, the rib facing the shoulder on the first wall and engaging the filter media to fix the filter media between the first and second walls, the rib being in spaced relation to the second wall to define a distribution chamber between the filter media and second wall for receiving unfiltered lubricating oil;

grooves in the peripheral rims of the shells defining shell peaks and valleys which shell peaks and shell valleys are received in the filter media peaks and valleys of the pleated pack filter media, and an unfiltered lubricating oil inlet through the second wall and a filtered lubricating oil outlet through the first wall, the inlet being laterally spaced from the outlet with the selected direction in which the peaks and valleys extend being from the inlet to the outlet, whereby unfiltered lubricating oil is spread over the filter media after entering the inlet; is filtered by the filter media; collected as filtered lubricating oil in the collection chamber, and passes through the outlet.

2. The lubricating oil filter of claim 1 wherein the housing has first and second d ends and wherein the lubricating oil inlet is disposed adjacent to the first end of the housing and the lubricating oil outlet is disposed adjacent to the second end of the housing.

3. The lubricating oil filter of claim 1 where in the housing is configured as a rectangle with the inlet being at one end of the rectangle and the outlet being at the other end of the rectangle.

4. The lubricating oil filter of claim 1 wherein there is a bypass valve connecting the distribution chamber to the collection chamber.

5. The lubricating oil filter of claim 1 wherein at least one probe for sensing lubrication oil condition is in communication with at least one of the chambers.

* * * * *

UNITED STATES PATENT AND TRADEMARK OFFICE
CERTIFICATE OF CORRECTION

PATENT NO. : 6,800,194 B1
DATED : October 5, 2004
INVENTOR(S) : Stamey Jr. et al.

It is certified that error appears in the above-identified patent and that said Letters Patent is hereby corrected as shown below:

Column 6,
Line 6, after "second" delete "d".

Signed and Sealed this

Twenty-ninth Day of March, 2005

JON W. DUDAS
*Director of the United States Patent and Trademark Office*